(12) United States Patent
Hong et al.

(10) Patent No.: US 6,188,449 B1
(45) Date of Patent: Feb. 13, 2001

(54) SEMIWIDE-SCREEN TELEVISION RECEIVER

(75) Inventors: Chang-Wan Hong, Anyang; Chel-Woon Youn; Sung-Pyo Hong, both of Suwon, all of (KR)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 08/744,319

(22) Filed: Nov. 7, 1996

(30) Foreign Application Priority Data

Nov. 7, 1995 (KR) .................................................. 95-40152

(51) Int. Cl.[7] ................. H04N 3/22; H04N 3/26
(52) U.S. Cl. .................. 348/806; 348/556; 348/913; 348/704
(58) Field of Search ..................... 348/556, 806, 348/913, 704; 315/370, 371, 368.24, 368.26, 368.28; 313/412, 413, 440, 426; 345/132; H04N 3/22, 3/223, 5/44, 7/01, 5/46

(56) References Cited

U.S. PATENT DOCUMENTS

| | | | |
|---|---|---|---|
| 3,622,835 | * 11/1971 | Parker | 315/368.15 |
| 3,628,082 | * 12/1971 | Dietz | 315/400 |
| 3,714,500 | * 1/1973 | Kaashoek | 315/368.18 |
| 3,844,006 | * 10/1974 | McGlashan | 445/3 |
| 3,944,884 | * 3/1976 | Wilocki | 315/400 |
| 3,983,450 | * 9/1976 | Lehnert | 315/370 |
| 4,267,541 | * 5/1981 | Narikiyo | 335/212 |
| 4,296,359 | * 10/1981 | Dodds | 315/370 |
| 4,334,173 | * 6/1982 | Gabriel et al. | 315/399 |
| 4,424,466 | * 1/1984 | Zeppenfeld | 313/433 |
| 4,439,713 | * 3/1984 | Nakamura et al. | 315/370 |
| 4,547,708 | * 10/1985 | Haferl | 315/371 |
| 4,748,371 | * 5/1988 | Bauder | 313/407 |
| 4,795,946 | * 1/1989 | Nishiyama | 315/370 |
| 5,008,600 | * 4/1991 | Hashimoto et al. | 315/370 |
| 5,086,259 | * 2/1992 | Sakurai et al. | 315/368.25 |
| 5,087,974 | * 2/1992 | Tsutsui et al. | 348/634 |
| 5,170,102 | * 12/1992 | Sluyterman et al. | 315/370 |
| 5,182,504 | * 1/1993 | Hagerl | 315/370 |
| 5,220,251 | * 6/1993 | Gawell et al. | 315/371 |
| 5,248,920 | * 9/1993 | Gioia et al. | 315/368.26 |
| 5,274,308 | * 12/1993 | Park et al. | 315/368.26 |
| 5,287,042 | * 2/1994 | Haferl | 315/370 |
| 5,319,280 | * 6/1994 | Vriens | 313/413 |
| 5,378,961 | * 1/1995 | Shiro et al. | 313/440 |
| 5,491,389 | * 2/1996 | Ferhsler et al. | 315/371 |
| 5,568,020 | * 10/1996 | Kaneko et al. | 315/370 |
| 5,777,697 | * 7/1998 | Baek | 348/806 |
| 5,812,210 | * 9/1998 | Arai et al. | 348/555 |
| 5,814,933 | * 9/1998 | Iwata et al. | 313/477 R |
| 5,825,427 | * 10/1998 | Macleod | 348/445 |

FOREIGN PATENT DOCUMENTS 62-122463 * 6/1987 (JP) .
5-207315 * 8/1993 (JP) .

* cited by examiner

*Primary Examiner*—John K. Peng
*Assistant Examiner*—Linus H. Lo
(74) *Attorney, Agent, or Firm*—Sughrue, Mion, Zinn, Macpeak & Seas, PLLC

(57) ABSTRACT

A semiwide-screen television receiver which can provide a horizontally extended picture on a screen. The receiver receives and displays on a cathode ray tube (CRT) an image signal having a 12:9 screen aspect ratio (AR), and includes a cathode ray tube having a horizontal dimension which is larger than that of a conventional CRT having a 4:3 screen aspect ratio. A deflection unit including an inductance variation device for adjusting the inductance value of a horizontal deflection coil is provided, so as to minimize an inductance dispersion of the deflection unit.

3 Claims, 11 Drawing Sheets

FIG.5

| ITEM | | 25" | | | 29" | | |
|---|---|---|---|---|---|---|---|
| | | Q 25 | 25" SF | △ | Q 29 | 29" UF | △ |
| DIMENSION (WITHOUT BAND) | H | 554.0 | 518.8 | +35.2 | 640.0 | 600.8 | +39.2 |
| | V | 406.0 | 406.3 | -0.3 | 471.0 | 471.2 | -0.2 |
| | D | 655.0 | 629.8 | +25.2 | 753.0 | 724.0 | +29.0 |
| USEFUL SCREEN DIMENSION | H | 504 | 478 | +26 | 576 | 540.8 | +35.2 |
| | V | 354 | 363 | -9 | 405 | 405.6 | -0.6 |
| | D | 616 | 590 | +26 | 704 | 676 | +28.0 |
| OUTER SURFACE CURVATURE | H | 1900 (1.7R) | 2042 (2.0R) | -142 | 2640 (2.2R) | 2980 (2.5R) | -340 |
| | V | 3050 (2.8R) | 2056 (2.0R) | +994 | 4226 (3.4R) | 2952 (2.5R) | +1274 |
| | D | 2177 (2.0R) | 2059 (2.0R) | +118 | 3017 (2.5R) | 2986 (2.5R) | +31 |
| INNER SURFACE CURVATURE | H | 1650 | 1690 | -40 | 2135 | 2290 | -155 |
| | V | 1850 | 1500 | +350 | 2285 | 1870 | +395 |
| | D | 1830 | 1730 | +100 | 2430 | 2370 | +60 |
| OVERALL LENGTH | | 415.5 | 411.0 | +4.5 | 459.1 | 449.9 | +9.2 |

SEMIWIDE-SCREEN TELEVISION RECEIVER

BACKGROUND OF THE INVENTION

1. Field of the Invention

The present invention relates to a semiwide-screen television receiver and, more particularly, to a semiwide-screen television receiver whereby the effective horizontal picture size can be widened. Consequently, side portions of the broadcast picture, which are conventionally invisible due to overscanning, can be projected on the screen to provide a horizontally expanded picture.

2. Description of the Prior Art

Generally, television broadcasting stations transmit video signals having a 12:9 or a 4:3 screen aspect ratio (AR). Referring to FIG. 1, the overall number of scanning lines in the NTSC system is 525, while the number of scanning lines for the visible image is 485 (i.e., overall scanning lines minus scanning lines for the vertical blanking periods provides: 525H−2×20H=485H, where H is a period for a scanning line). Also, the effective horizontal scanning period is determined by subtracting the horizontal blanking period from one scanning period (1H)(63.5 μs−10.9 μs=52.6 μs). As can be appreciated from the above, in a typical television receiver of the NTSC standard, less than 100% of the broadcast image is displayed on the cathode ray tube (CRT) screen.

FIG. 2 illustrates test patterns shown on the screen for testing the image received by the television receiver. FIG. 3 illustrates a test pattern, from the test patterns of FIG. 2, which is utilized for testing the overscanning.

In a typical NTSC type television receiver, an overscanning of about 9.4% in vertical and horizontal directions is performed. Therefore, vertical and horizontal edge portions of 9.4% of the 4:3 screen AR image signal transmitted from the broadcasting station cannot be viewed. Overscanning is performed in order to prevent displaying a distorted image on the edge portions of the screen due to an unstable deflection, unstable focusing, unstable high voltage, etc. of the CRT. Specifically, the inductance dispersion in the deflection unit causes instability of the image displayed on the edge portions of the screen.

That is, if the inductance of the horizontal deflection coil is greater than its specified value, the corresponding impedance is increased and horizontal deflection current is decreased. Consequently, the width of the image is narrowed and a part of the blanking interval may be viewed on the right and left edge portions of the screen. On the contrary, if the inductance is small, the corresponding impedance is decreased and horizontal deflection current is increased. Consequently, the width of the image is widened and a larger portion of the picture information is concealed at the edges of the screen. Overscanning helps avoiding these variations in the width of the displayed image.

In order to satisfy the limited conditions of the television receiver as described above, and to display a stable image on the screen, the overscanning of 9.4% in the vertical and horizontal directions has been adopted by manufacturers of television receivers since about 1960.

Recently, a wide-vision television receiver which displays a video signal having a 12:9 screen AR on a screen having a 16:9 screen AR has been introduced. According to this wide-vision standard, the scanning lines are not changed, but the image displayed on the screen is horizontally expanded by about 1.33 times. Meanwhile, techniques for receiving a 16:9 screen AR broadcast video signal and displaying it on a display screen of a 4:3 screen AR or of a 16:9 screen AR have been introduced. For instance, U.S. Pat. No. 5,386,236 discloses such a technique.

However, when a 4:3 screen AR broadcast signal is displayed on the 16:9 AR screen, the displayed image is distorted since the image is merely expanded in the horizontal direction to fit the screen. Further, when the received image is not expanded, black panels are shown on the top and bottom portions, or the right and left edge portions of the screen.

SUMMARY OF THE INVENTION

It is an object of the present invention to solve the problems involved in the prior art, and to provide a semiwide-screen television receiver which can display an undistorted horizontally expanded image by reducing the rate of overscanning in the horizontal direction. This can be accomplished by increasing the horizontal picture size of the cathode ray tube.

In order to achieve the above object, there is provided a semiwide-screen television receiver receiving and displaying on a cathode ray tube an image signal having a 12:9 screen aspect ratio, said semiwide-screen television receiver comprising: a cathode ray tube having a horizontal size larger than that of the conventional 4:3 screen aspect ratio; and a deflection unit including an inductance variation means for adjusting the inductance value of the horizontal deflection coil so as to minimize the inductance dispersion of the deflection unit.

BRIEF DESCRIPTION OF THE DRAWINGS

The above object, and other features and advantages of the present invention, will become more apparent by describing the preferred embodiments thereof with reference to the accompanying drawings, in which:

FIG. 5 is a table showing the dimensions of the semiwide-screen CRT according to the present invention in comparison with those of the 4:3 screen AR CRT;

DETAILED DESCRIPTION OF PREFERRED EMBODIMENTS

Figure 1:
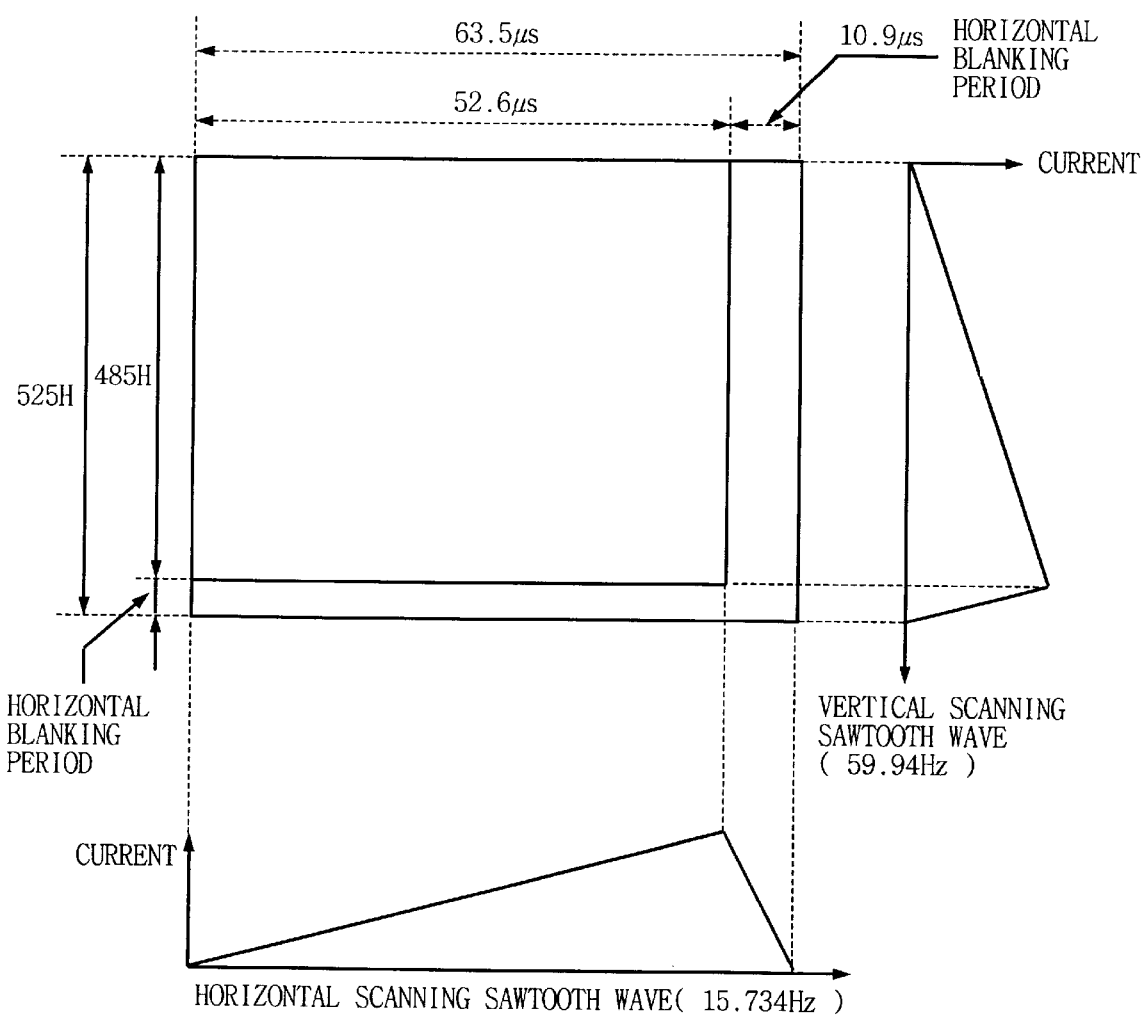
FIG. 1 is a view explaining a display screen of an NTSC type television receiver.
Figure 2:
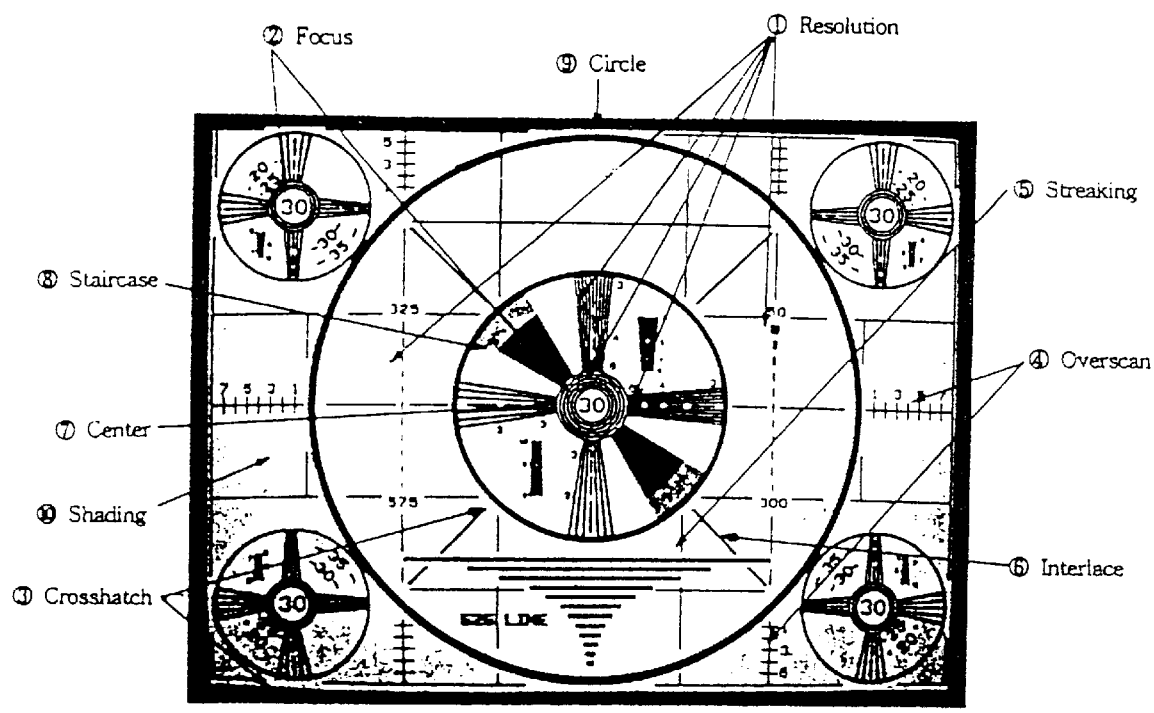
FIG. 2 is a view illustrating test patterns for the picture adjustment in an NTSC type television receiver.
Figure 3:
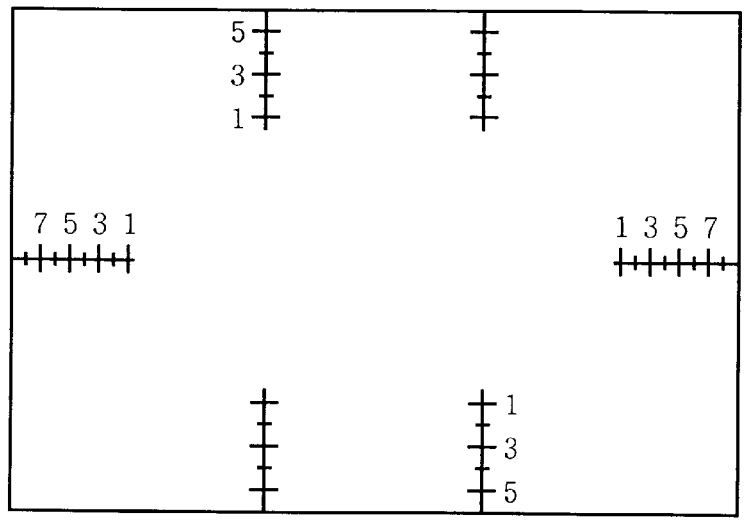
FIG. 3 is a view illustrating an overscanning test pattern among the test patterns of FIG. 2.
Figure 4:
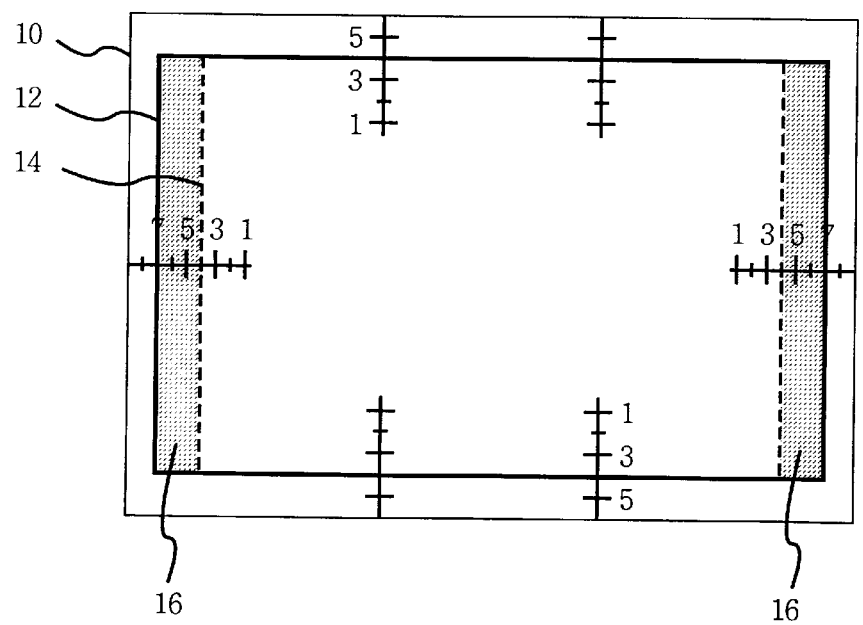
FIG. 4 is a view illustrating a CRT screen and an overscanning rate of the semiwide-screen television receiver according to the present invention.

FIG. 4 is a view illustrating a CRT screen and an overscanning rate of the semiwide-screen television receiver according to the present invention. In FIG. 4, the outer rectangle 10, shown as a thin solid line represents the picture size of a 12:9 screen AR image signal transmitted from a broadcasting station. The middle rectangle 12, shown in a thick solid line, represents the picture size of the CRT according to the present invention, and the inner rectangle 14, shown as a dotted line, represents the picture size of a conventional 4:3 AR CRT. As illustrated, the CRT according to the present invention is wider than that of a conventional CRT. Therefore, according to the present invention, the rate of overscanning is reduced from 9.4% to 3.2%, and additional information as represented by the darkened portions 16 can be viewed on the display screen.

As a result, according to the present invention, additional image information of about one inch in a horizontal direction can be viewed, as compared with the conventional CRT having a 4:3 screen AR. Further, the CRT according to the present invention can be manufactured by manufacturing processes similar to those used to manufacture the 4:3 screen AR CRT, avoiding any increase in manufacturing cost. According to the present invention, the image information is not extended in the vertical direction, but is rather extended only in the horizontal direction, so that an undistorted horizontally extended image is displayed. However, in order to display the horizontally extended image, the physical dimensions of the CRT should be changed.

Specifically, in order to effect the 12.8:9 screen AR image display without the change of the area of the 4:3 screen AR CRT, the dimensions of the conventional 25 inches and 29 inches CRTs are changed, respectively, in accordance with the comparison table of FIG. 5. In the table, the reference numerals Q25 and Q29 denote a super flat CRT of a 4:3 screen AR, and UF denotes an ultra flat CRT.

Here, in order to provide a high-quality picture, the radius (R) of the vertical edge portion of the CRT is widened, resulting in that the depth of the cabinet crater portion is minimized and the evenness of the CRT is emphasized.

It is preferable to change the radius (R) of the 12.8:9 screen AR CRT according to the following table.

| Inch | Diagonal | Horizontal | Vertical |
|---|---|---|---|
| 30 inches | 2.4R | 2.2R | 3.4R |
| 26 inches | 2.0R | 1.7R | 2.8R |

Meanwhile, in order to display a 4:3 screen AR image on a 12.8:9 screen AR CRT, the high voltage to be provided to the CRT should be stabilized, the horizontal raster shift be compensated for, and the linearity be improved. The horizontal overscanning should be reduced from 9.4% to 3.2% by changing the horizontal deflection circuit. At this time, the vertical overscanning is determined identical to that in the 4:3 screen AR CRT.

If the image is vertically extended, the resulting image will not be widened and the advantages of the wide-screen will be voided. Therefore, according to the present invention, the image information is extended only horizontally to provide a horizontally widened picture on the screen. Specifically, the effective picture in the horizontal direction is widened from the 4:3 screen AR to 12.8:9 screen AR, so that the right and left side portions of the image signal transmitted from the broadcasting station can be viewed on the screen.

If an inductance dispersion of the horizontal deflection coil in the deflection yoke exists, the amplitude dispersion of the horizontal picture is produced. Accordingly, the semiwide-screen television receiver according to the present invention employs an inductance variation device connected in series to the horizontal deflection coil in the deflection yoke to minimize the inductance dispersion of the horizontal deflection coil. Thus, the amplitude dispersion of the horizontal picture is minimized and the entire effective image signal can be viewed on the screen.

In the semiwide-screen television receiver, since the horizontal overscanning rate of the image signal is 3.2%, a precise control of the picture amplitude is required. Accordingly, the inductance dispersion, which affects the amplitude in the deflection yoke, should be minimized.

Referring to FIG. 6, the inductance variation device IV1 is connected to the horizontal deflection coils HC1 and HC2, causing the inductance value of the horizontal deflection coils HC1 and HC2 to be determined lower than the index center value by 1~2%. The remaining 1~2% of the inductance value is adjusted by means of the inductance variation device IV1, and thus a precise control of inductance is possible. Specifically, the inductance dispersion generated during the wiring and assembling of the deflection yoke can be minimized by adjusting the inductance variation device IV1. Therefore a stable display of the image can be obtained even though the rate of overscanning is lowered to 3.2%.

Figure 6A:
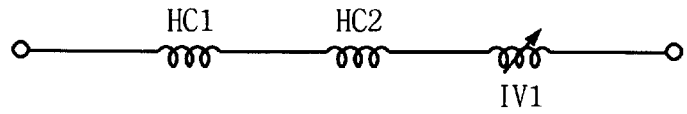
FIGS. 6A to 6C are circuit diagrams illustrating various horizontal deflection coils according to the present invention.
Figure 6B:
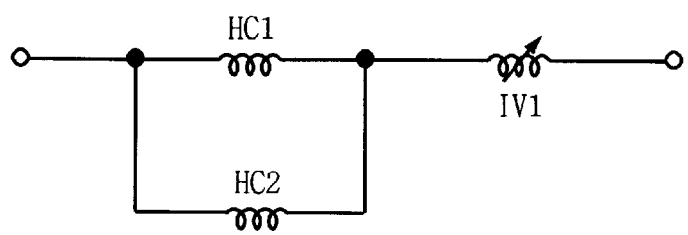
Figure 6C:
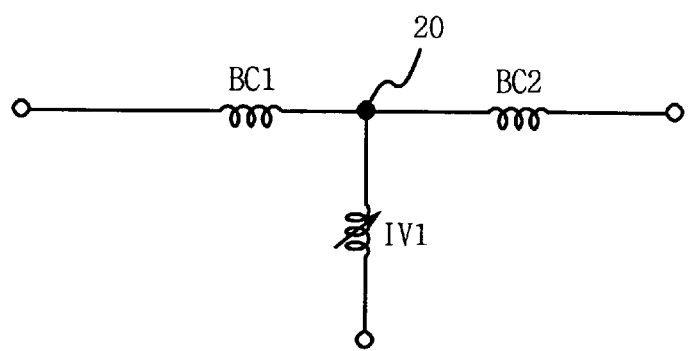

The inductance variation device IV1, as shown in FIG. 6A, may be connected in series to the pair of horizontal deflection coils HC1 and HC2 which are connected together in series, or may be connected together in series to the horizontal deflection coils HC1 and HC2 which are connected in parallel as shown in FIG. 6B. Meanwhile, the inductance variation device IV1 may be connected together to the center tap 20 of the balance coils BC1 and BC2 for adjusting the balance of the pair of horizontal deflection coils HC1 and HC2 connected in parallel as shown in FIG. 6C.

As an alternative, according to the present invention, the inductance dispersion may be minimized by adjusting the convergence and orthogonality of the deflection yoke, instead of employing the inductance variation device. The adjustment of the convergence and orthogonality of the deflection yoke is performed as follows.

When the deflection yoke is attached to the CRT, the characteristic errors of the CRT itself and/or the environmental changes caused by the associated devices are unavoidable. Thus, the accurate orthogonal characteristic of the horizontal and vertical raster in the displaying screen, and the symmetrical characteristic of the convergence on the periphery of the screen, cannot be guaranteed. Thus, the picture dispersion should be kept to a minimum.

Figure 7:
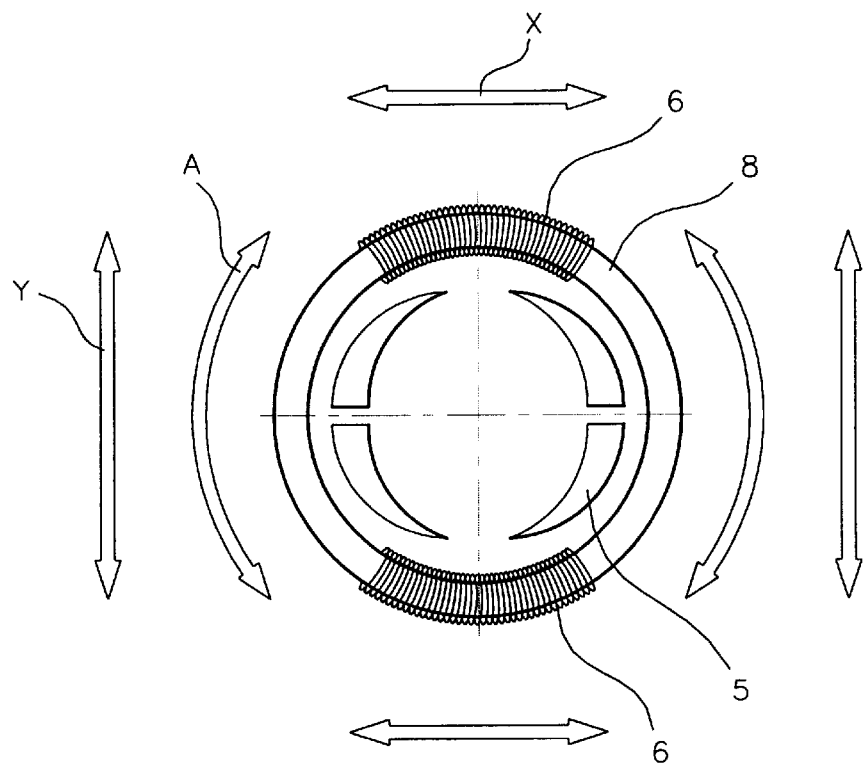
FIG. 7 is a sectional view of a deflection yoke, explaining the potential displacement of the vertical deflection coils.
Figure 8A:
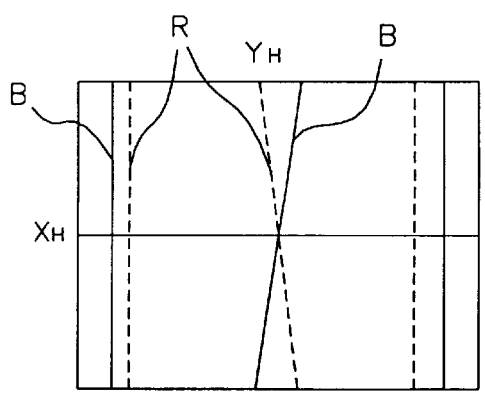
FIG. 8A is a view illustrating an asymmetrical state of the R and B beams before adjustment.
Figure 8B:
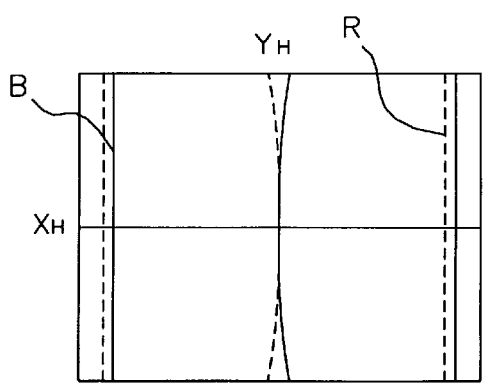
FIG. 8B is a view illustrating a symmetrical state of the R and B beams after adjustment.

As shown in FIG. 7, if the vertical deflection coil is adjusted in the X and Y directions, and then rotated in the A direction after the horizontal deflection coil is fixed to an optimum position of the CRT, the asymmetrical picture state shown in FIG. 8A becomes symmetrical as shown in FIG. 8B. In other words, if the vertical deflection coil is eccentric in the X and Y directions with respect to the horizontal deflection coil, the asymmetric state of the convergence is effected as shown in FIG. 8A. Thus, by moving the vertical deflection coil in the X and Y directions shown in FIG. 7, the horizontal convergence XH of the R and B beams at the left and right edges of the horizontal center line of the screen, and the horizontal convergence YH of the R and B beams at the upper and lower edges on the vertical center line of the screen become symmetrical.

Figure 9B:
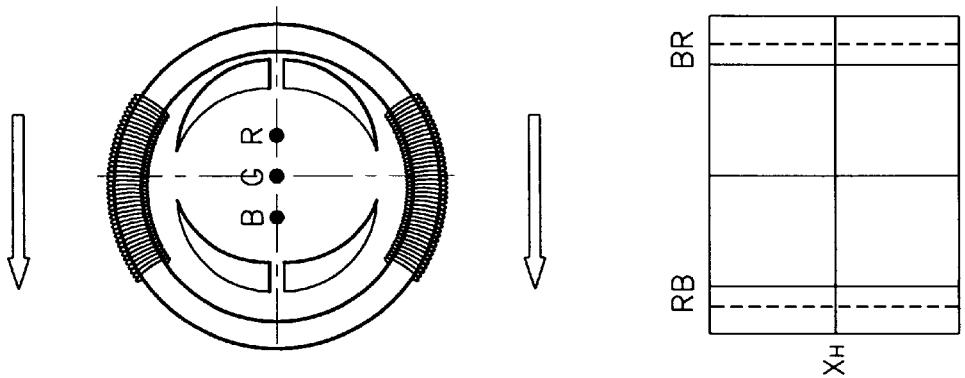
FIGS. 9A and 9B are views explaining the screen state in the event that the vertical deflection coil is moved in the X direction.
Figure 9A:
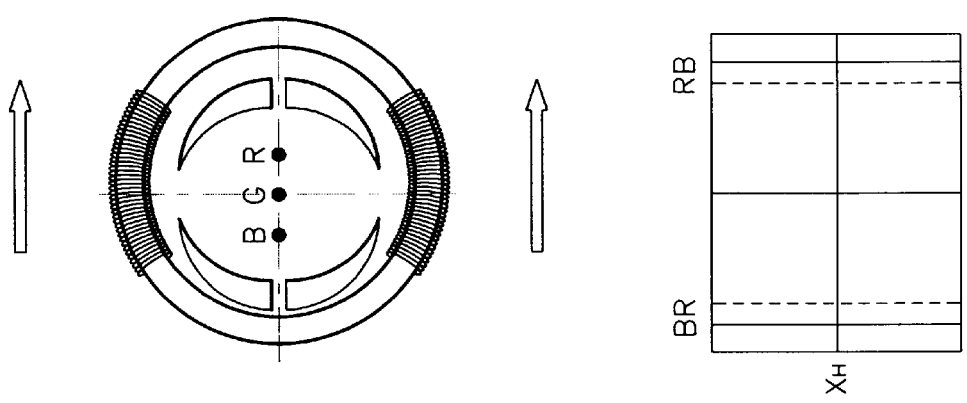
Figure 10B:
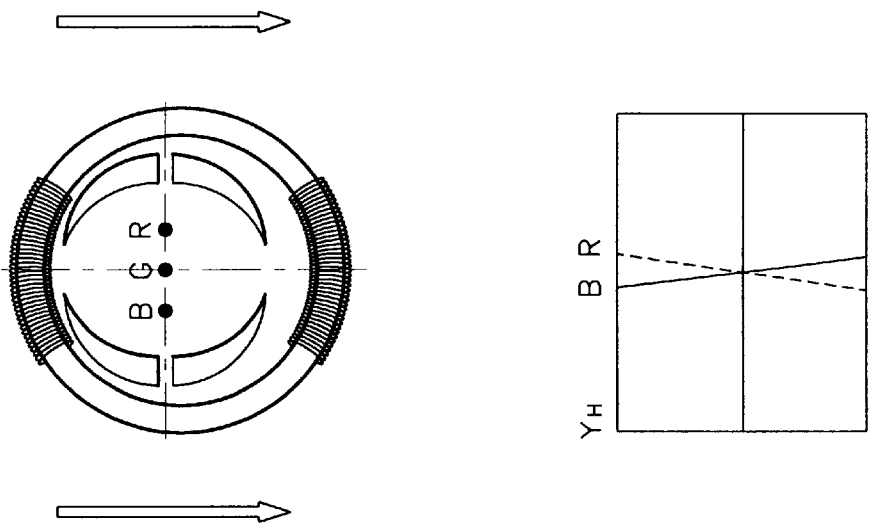
FIGS. 10A and 10B are views explaining the screen state in the event that the vertical deflection coil is moved in the Y direction.
Figure 10A:
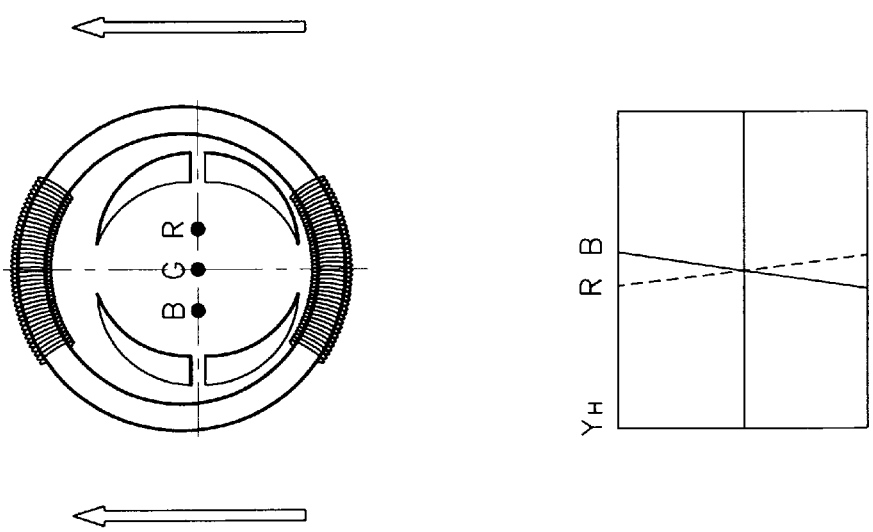
Figure 11A:
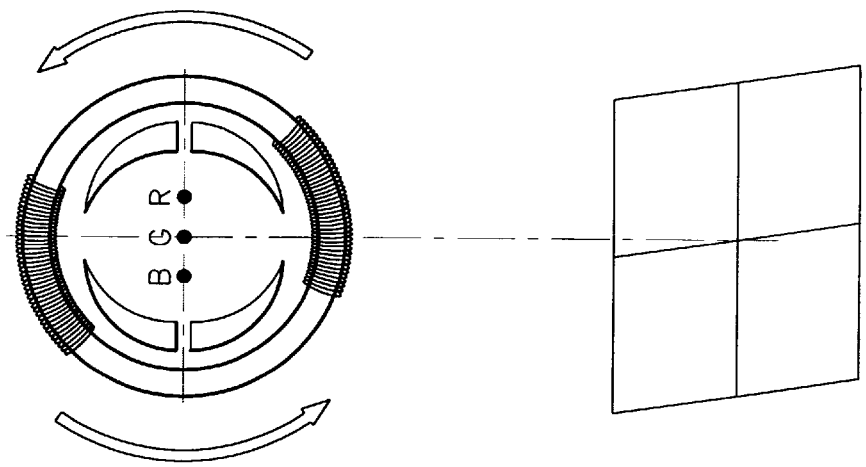
FIGS. 11A and 11B are views explaining the screen state in the event that the vertical deflection coil is rotated.
Figure 11B:
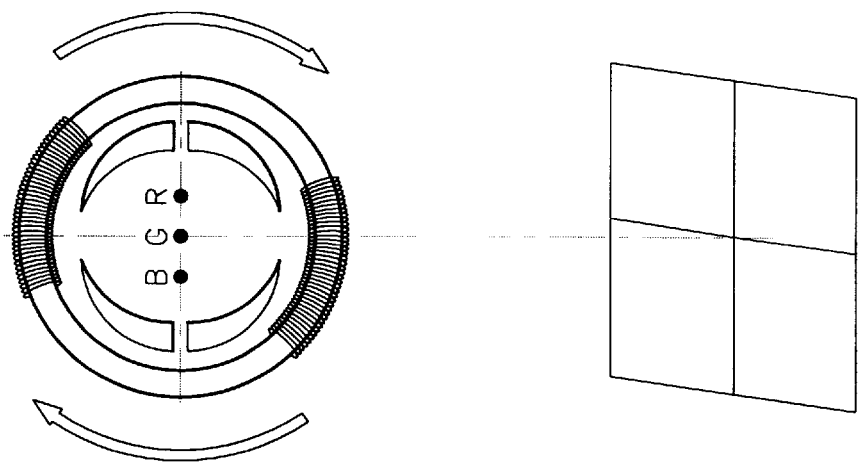

FIGS. 9A and 9B illustrate the asymmetric state of the horizontal convergence XH in the event that the vertical deflection is eccentric in the X direction, as the deflection yoke is fixed to an optimum position of the CRT, and the vertical deflection coil is fixed to an optimum position in the X direction. FIGS. 10A and 10B illustrate the asymmetric state of the horizontal convergence YH in the event that the vertical deflection coil is eccentric in the Y direction when the deflection yoke is fixed to an optimum position of the CRT. FIGS. 11A and 11B illustrates the distortion state of the orthogonality generated when the vertical deflection coil is rotated in the A direction, i.e., clockwise or counter clockwise when the deflection yoke is fixed to an optimum position of the CRT.

As described above, according to the present invention, the convergence and the orthogonality of the CRT can be accurately adjusted by rotating or moving the vertical deflection coil to the right, left, upward and downward directions after the horizontal deflection coil is fixed to an optimum position of the CRT. Thus, the deterioration of the picture quality due to the inductance dispersion can be minimized by the above described adjustment.

From the foregoing, it will be apparent that the semiwide-screen television receiver according to the present invention provides the advantages that it can provide a horizontally extended picture with a stable and pleasant appearance of the CRT by increasing the picture size in the horizontal direction as compared to the conventional 4:3 screen AR CRT.

Figure 12A:
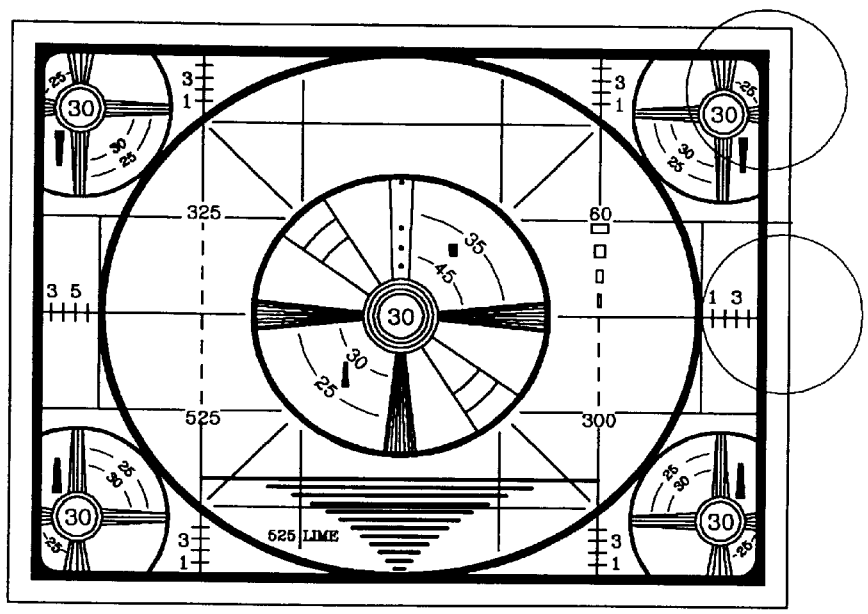
FIG. 12A is a view showing the state of the test pattern displayed on a 4:3 AR screen.
Figure 12B:
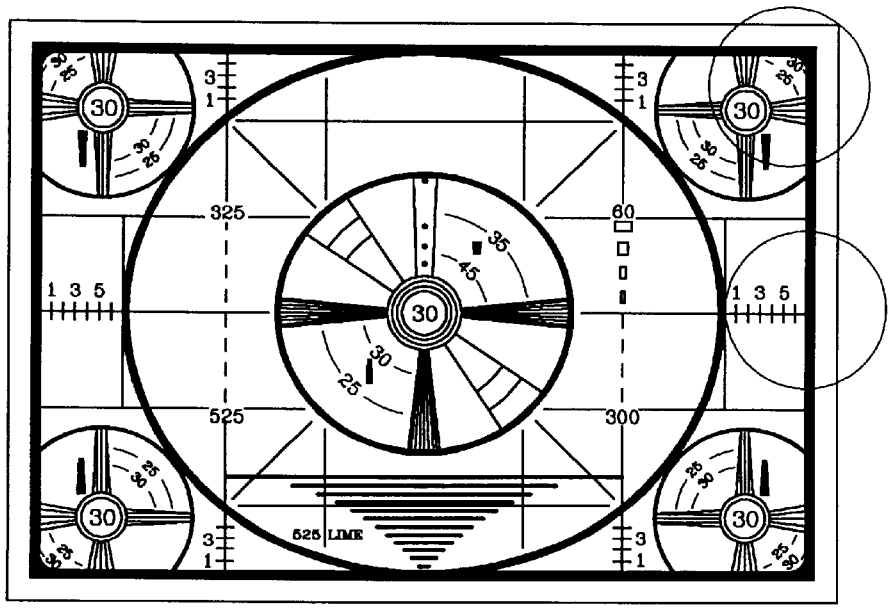
FIG. 12B is a view showing the state of the test pattern displayed on a 12:8.3 AR screen according to the present invention.
Figure 13A:
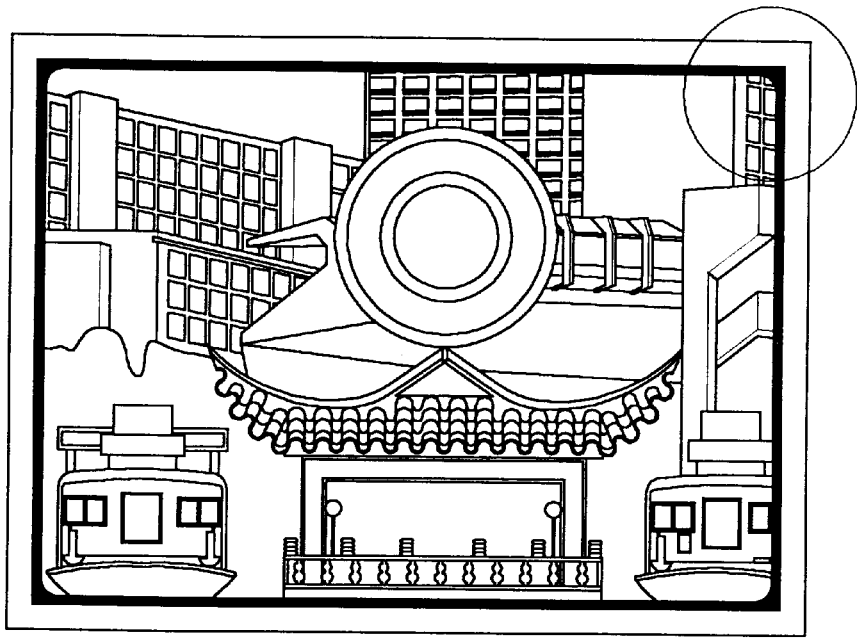
FIG. 13A is a view showing a broadcasted image displayed on a 4:3 AR CRT.
Figure 13B:
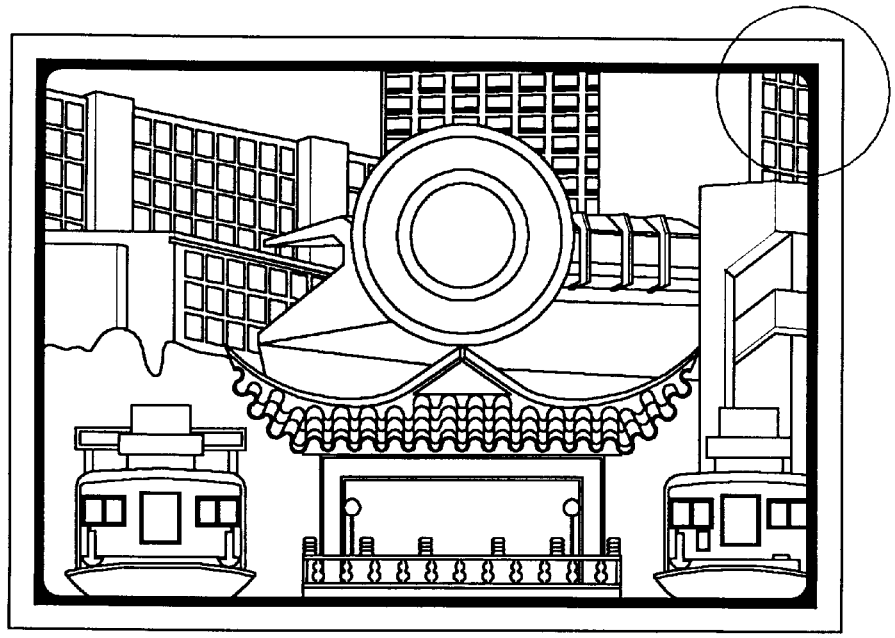
FIG. 13B is a view showing the broadcasted image of FIG. 13A displayed on a 12:8.3 AR CRT.

For example, FIGS. 12A, 12B, 13A and 13B illustrate an image displayed on the conventional 4:3 screen AR CRT, and an image displayed on the 12.8:9 screen AR CRT according to the present invention for comparison purpose. As illustrated, the conventional CRT in FIG. 12A shows the horizontal overscanning degree of about 4, while the CRT in FIG. 12B shows the horizontal overscanning degree of over 6. FIG. 13B shows in the horizontal direction more glass windows of the building than are shown in FIG. 13A.

While the present invention has been described and illustrated herein with reference to the preferred embodiments thereof, it will be understood by those skilled in the art that various changes in form and details may be made therein without departing from the spirit and scope of the invention.

What is claimed is:

1. A semiwide-screen television receiver and displaying on a cathode ray tube a broadcasted image signal having a 12:9 screen aspect ratio, said semiwide-screen television receiver comprising:

a cathode ray tube having a horizontal dimension which is larger than a cathode ray tube having a 4:3 screen aspect ratio;

a deflection unit; and an inductance variation circuit for adjusting an inductance value of a horizontal deflection coil to minimize an inductance dispersion of said deflection unit, wherein said cathode ray tube has a 12.8:9 screen aspect ratio, and wherein a diagonal dimension of said cathode ray tube having said 12.8:9 screen aspect ratio is 26 inches, and an outer surface curvature of said cathode ray tube is determined so that its diagonal is 2.0 R, its horizontal is 1.7 R, and its vertical is 2.8 R, where R represents a radius of said cathode ray tube.

2. A semiwide-screen television receiver and displaying on a cathode ray tube a broadcasted image signal having a 12:9 screen aspect ratio, said semiwide-screen television receiver comprising:

a cathode ray tube having a horizontal dimension which is larger than a cathode ray tube having a 4:3 screen aspect ratio;

a deflection unit; and an inductance variation circuit for adjusting an inductance value of a horizontal deflection coil to minimize an inductance dispersion of said deflection unit, wherein said cathode ray tube has a 12.8:9 screen aspect ratio, and wherein a diagonal dimension of said cathode ray tube having said 12.8:9 screen aspect ratio is 30 inches, and an outer surface curvature of said cathode ray tube is determined so that its diagonal is 2.4 R, its horizontal is 2.2 R, and its vertical is 3.4 R, where R represents a radius of said cathode ray tube.

3. A semiwide-screen television receiver and displaying on a cathode ray tube a broadcasted image signal having a 12:9 screen aspect ratio, said semiwide-screen television receiver comprising:

a cathode ray tube having a horizontal dimension which is larger than a cathode ray tube having a 4:3 screen aspect ratio;

a deflection unit; and an inductance variation circuit for adjusting an inductance value of a horizontal deflection coil to minimize an inductance dispersion of said deflection unit;

wherein 98~99% of a total horizontal inductance value is provided by the horizontal deflection coil, and a remaining 1~2% thereof is provided by said inductance variation circuit.

\* \* \* \* \*